Nov. 10, 1925.
R. F. STEWART
1,560,619
MACHINE FOR CUTTING BUTTER AND THE LIKE
Filed Nov. 4, 1924     4 Sheets-Sheet 2
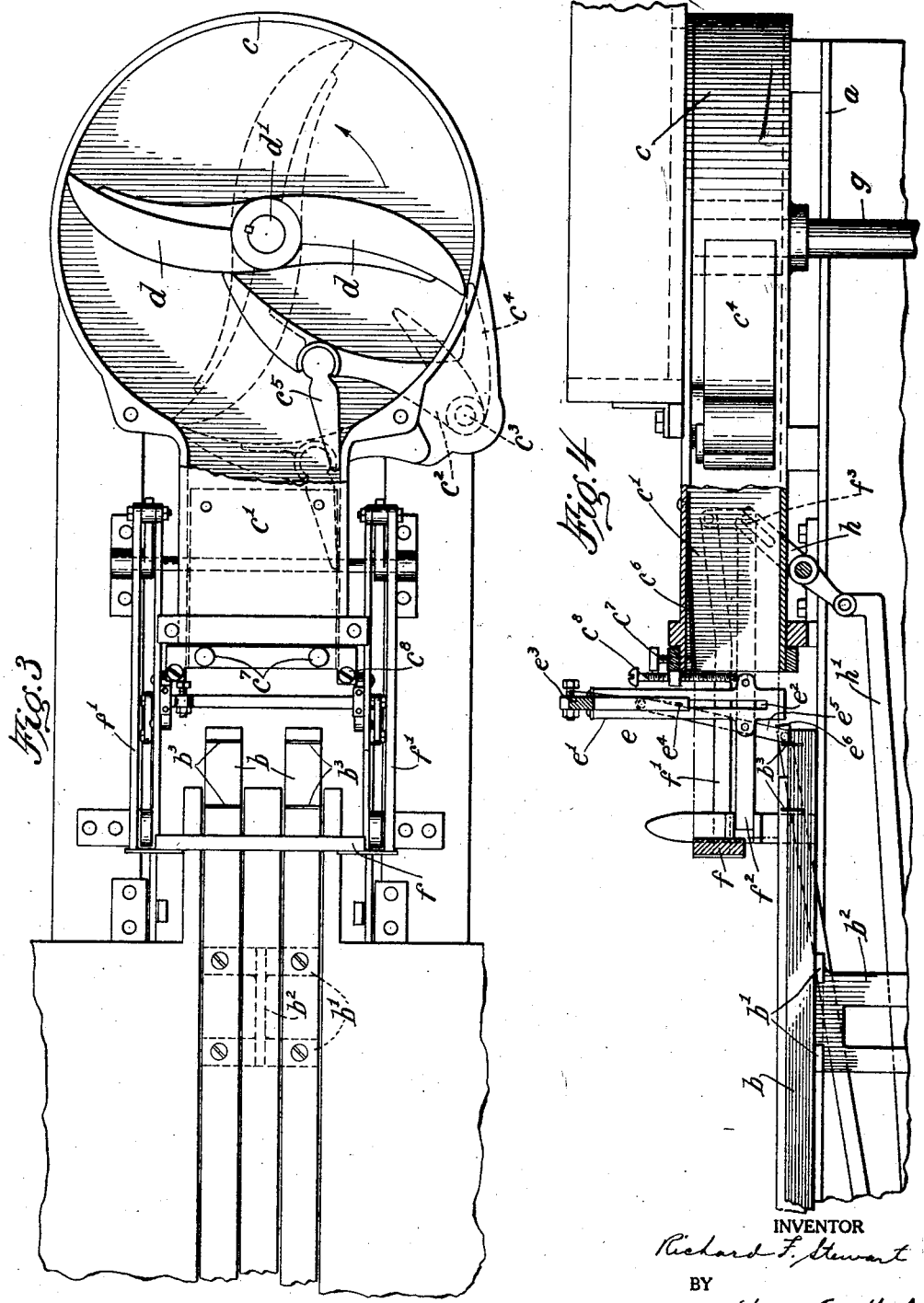
INVENTOR
Richard F. Stewart
BY
Redding, Greeley, O'Shea & Campbell
ATTORNEYS

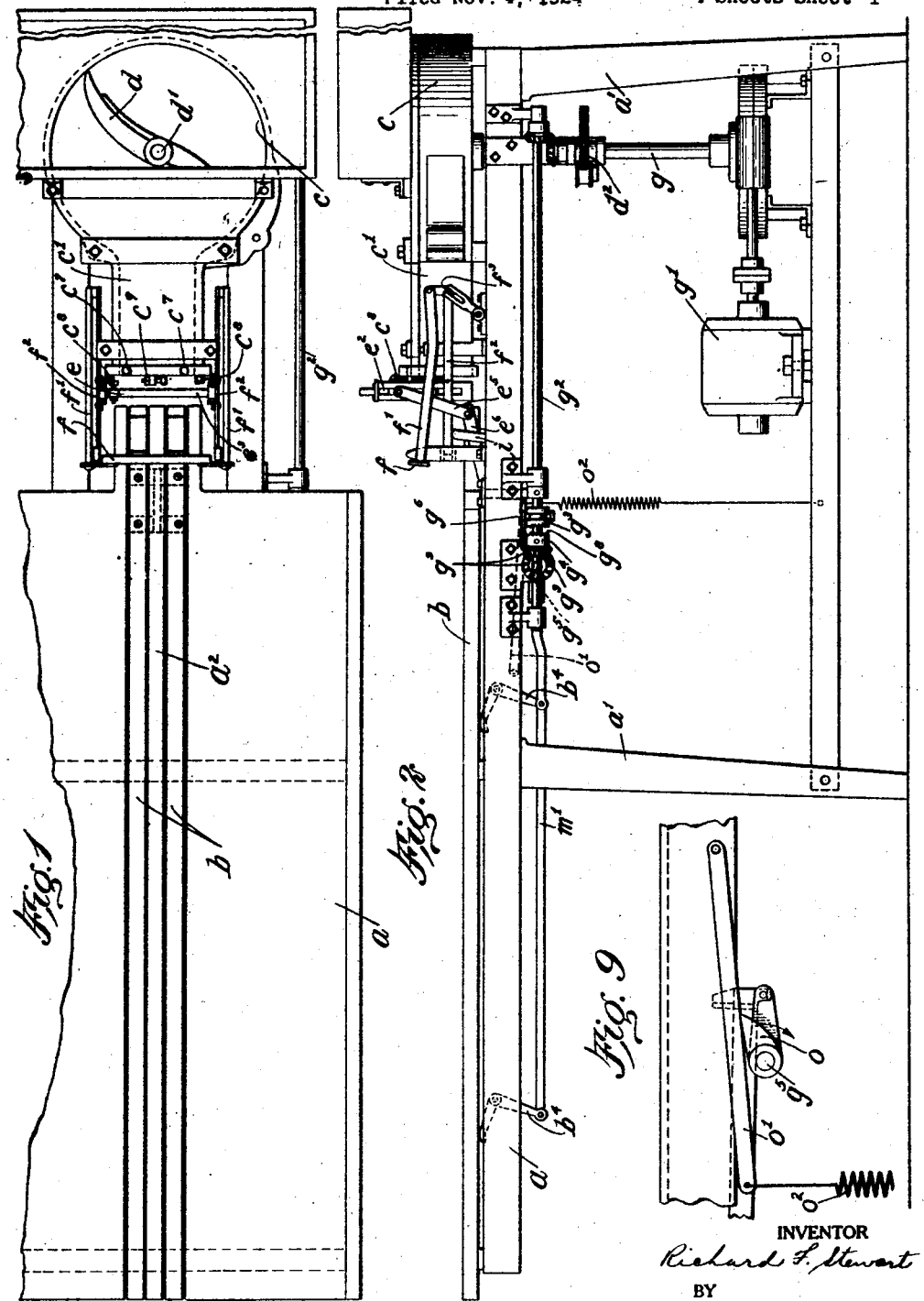

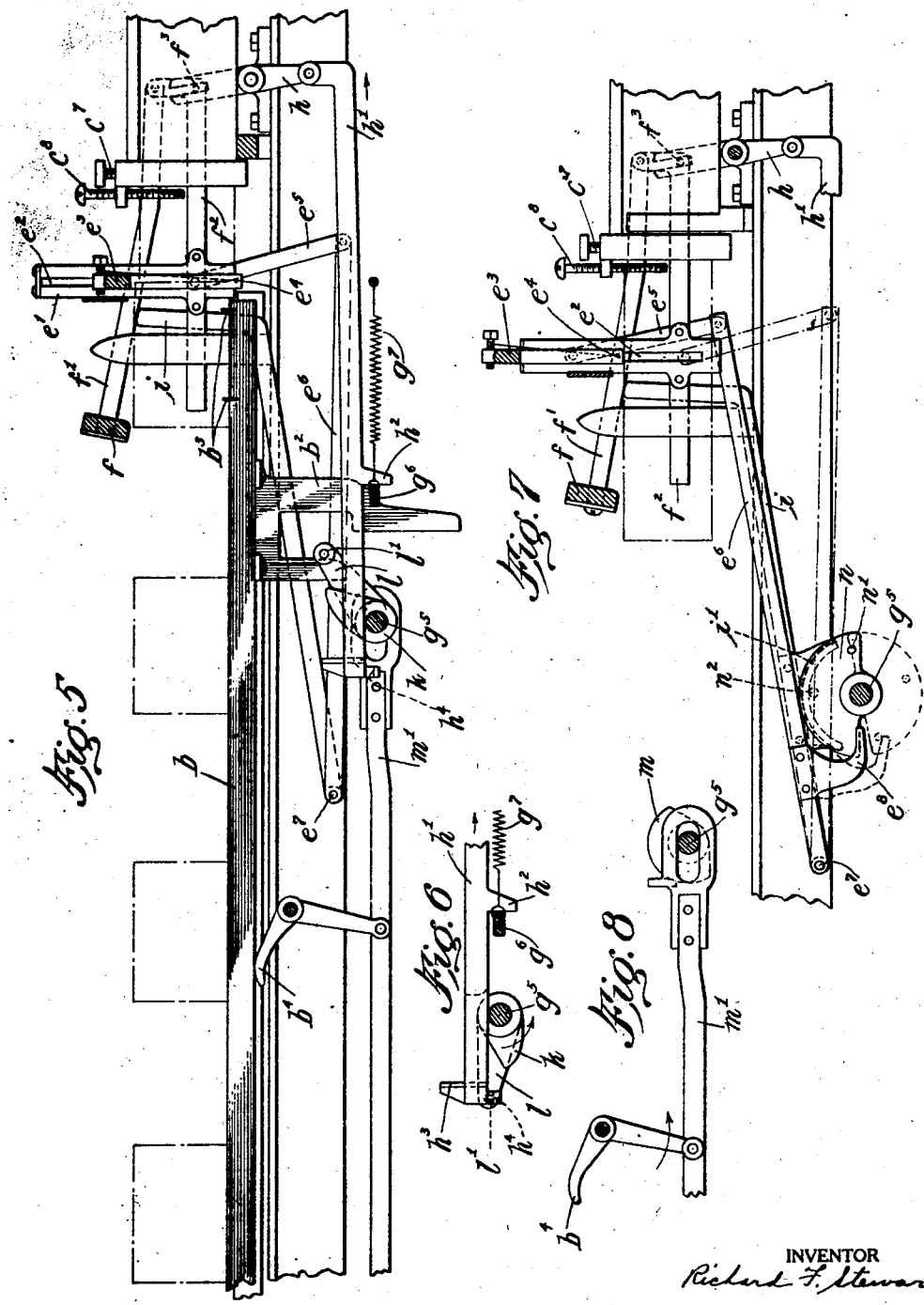

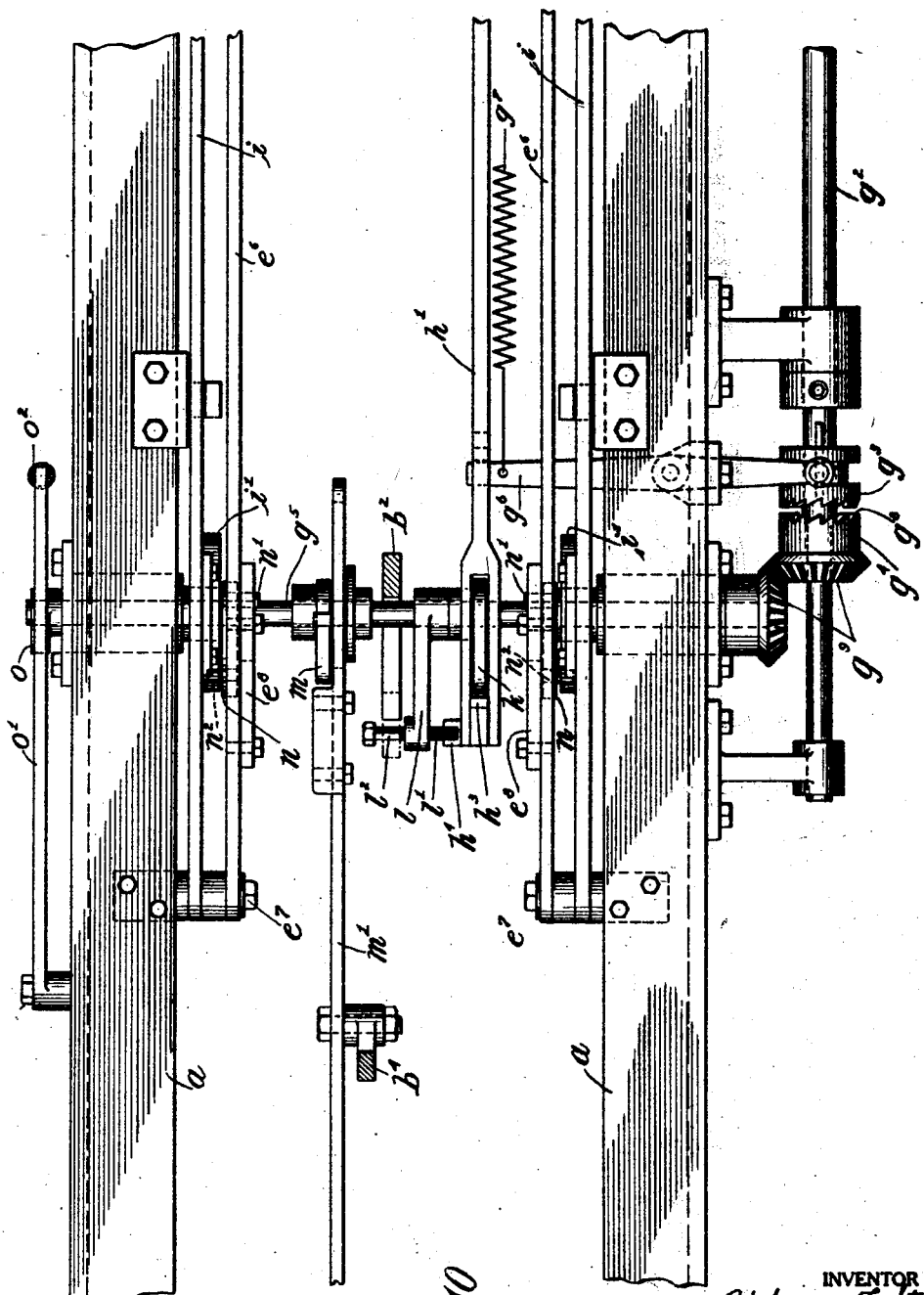

Patented Nov. 10, 1925.

1,560,619

UNITED STATES PATENT OFFICE.

RICHARD F. STEWART, OF BRIARCLIFF MANOR, NEW YORK.

MACHINE FOR CUTTING BUTTER AND THE LIKE.

Application filed November 4, 1924. Serial No. 747,834.

*To all whom it may concern:*

Be it known that I, RICHARD F. STEWART, a citizen of the United States, residing at Briarcliff Manor, in the State of New York, have invented certain new and useful Improvements in Machines for Cutting Butter and the like, of which the following is a specification, reference being had to the accompanying drawings, forming a part hereof.

This invention relates to a machine of simple construction for cutting butter and similar material, usually into blocks of predetermined weight or size. More particularly, the invention is concerned with such a machine in which the successive operations are co-ordinated automatically in such manner as to require no control on the part of the operator other than the feeding of the material into the hopper in bulk. The improved machine itself is characterized by fewness of parts, certainty of operation, ease of adjustment and the employment of a minimum number of springs and other delicate devices subject to wear and disintegration. In accordance with the invention the machine carries the butter or like material from the hopper by a mechanism which insures homogeneous packing, discharges it in such compacted condition past devices which automatically cut it into slabs of desired length, width or thickness onto a conveyor where its travel is continued automatically in substantially direct line from the line of discharge and insures the continuous and uninterrupted deposit, at intervals, of slabs thus cut. The material itself is employed for controlling the devices initiating periodically operation of the conveyor and operation of the cutter.

These and other objects of the invention as indicated generally hereinbefore will appear more particularly in connection with the description of the embodiment illustrated in the accompanying drawings, wherein:

Figure 1 is a view in plan of a machine for cutting butter, in accordance with the invention.

Figure 2 is a view in side elevation thereof.

Figure 3 is a detailed view in plan and on a somewhat larger scale showing particularly the devices for feeding the butter from the hopper and compacting it, a part of the cover of the hopper being removed for clearness.

Figure 4 is a detailed view party in side elevation and partly in vertical section of so much of the machine as is illustrated in Figure 3 and showing particularly the relation of the delivery chute to the conveyor.

Figure 5 is a view partly in side elevation and partly in section of the parts shown in Figure 4 but illustrating, in addition, the operating mechanism for the conveyor and the clutch control means.

Figure 6 is a detailed view in side elevation illustrating the clutch control means.

Figure 7 is a view partly in side elevation and partly in section showing particularly the operating means for the cutter.

Figure 8 is a fragmentary detailed view showing the means for raising and lowering the conveyor bars.

Figure 9 is a fragmentary detailed view in side elevation showing spring means for kicking the parts off dead center in certain positions.

Figure 10 is an enlarged detail view in plan of the power actuating means.

While, as the description proceeds, it will be evident to one skilled in the art that mechanical changes may be made and equivalents substituted in some instances, generally speaking, the machine as illustrated is characterized by the utmost simplicity in construction and arrangement, as is desirable for machines doing this character of work where continuous operation in the hands of unskilled operators is essential and where the working conditions often subject the parts to deterioration.

The machine comprises in its essential parts a table $a$ supported by legs $a'$, movable interconnected slats $b$ carried thereon and adapted to receive and convey prints of butter, a hopper $c$ in which butter is placed in bulk, a power operated revolving paddle $d$ within the hopper to force the butter through a feed chute $c'$ wherein it is compacted uniformly and presented to suitable cutting devices indicated generally at $e$ for deposit of the cut prints onto the slats $b$ by which such prints are conveyed with a straight line feed along the table $a$ for wrapping by operators. Before entering into a detailed description of the operating mechanism by which automatic timing and continuity of operation are insured it might be pointed out that operation of the mechanism is initiated by the pressure of the butter itself which is forced against a latch bar $f$ suitably interconnected with the operating mechanism and itself adapted to be rocked automatically out of the path of the print after operation of the devices has been initiated.

The feed of the butter from the hopper $c$ is brought about continuously by the propelling paddle $d$ which is keyed on a vertical shaft $d'$ driven through a chain and sprocket $d^2$ from a power shaft $g$ geared to a prime mover $g'$, such as an electric motor. The press of butter is constantly directed towards the chute $c'$ and compacted therein more effectively by a novel oscillating presser arm $c^2$ pivoted at $c^3$ at one side of the hopper but oscillated by direct engagement therewith of the reversely curved side of the paddle $d$. The arm $c^2$ is formed as a bell crank lever having a short arm $c^4$ which is thrown into the path of the onwardly sweeping paddle $d$ immediately after the long arm has been forced into the mouth of the chute $c'$ as indicated in dotted lines in Figure 3. In the arm $c^2$ is pivoted a gate valve $c^5$ which lies substantially in prolongation of the side wall of the chute $c'$ when the arm $c^2$ is withdrawn from its mouth but moves inwardly along the wall of the chute when the arm $c^2$ is pressed towards its mouth, the two co-operating at all times to confine and direct the onward movement of the butter into the chute and prevent its deflection around the curved wall of the hopper. The paddle $d$, by the construction described serves the dual function of engaging the butter directly and forcing it onwardly through a limited angle and later forcing the arm $c^2$ behind the butter in the chute to more effectively compact the butter and discharge it as will be explained. The chute $c'$ may be provided with a false wall plate $c^6$, the clearance of which may be adjusted by set screws $c^7$ preferably disposed near the mouth of the chute thereby accentuating the compression of the butter and insuring its discharge in homogeneous compactness.

Immediately at the discharge end of the chute $c'$ may be mounted on screws $c^8$ and $c^9$ a series of horizontal and vertical spaced wires (not illustrated) forming a patch work to cut the butter into rectangular slabs, if desired, before it is cut into predetermined length. Spaced beyond the mouth of the chute $c'$ but in such relation to receive the butter are the slats $b$ which are adapted to have a horizontal reciprocating and undulating movement as will be described later to convey the butter along the table. Between the end of the chute and these slats and at opposite sides of the butter prints vertical slide pieces $e'$ are secured and these have slots $e^2$ in which reciprocates vertically a U-frame $e^3$ carrying a cross wire $e^4$ which is forced down through the butter when the frame is pulled downwardly to cut the butter into prints of predetermined length. As shown most clearly in Figures 5 and 7 one of the side bars of the frame $e^3$ has pivoted thereto a link $e^5$ which in turn is pivoted to a long arm $e^6$ adapted to rock on a pivot $e^7$ carried by the table. This linkage serves to reciprocate the cutter in a manner which will be described later. The butter before being cut is extruded from the chute $c'$ to a point where it engages the clutch bar $f$ and by continued pressure of the feeding devices moves that bar an appreciable distance sufficient to initiate operation of the cutting and feeding mechanism. The bar $f$, as shown in Figure 3, is pivoted through side rails $f'$ to sliding bars $f^2$ which support it. The slides $f^2$ carry at their rear ends pins $f^3$ which engage slotted crank arms $h$ pivoted to pull rods $h'$ for a purpose to be described. When the butter engages the clutch bar $f$ and moves it bodily towards the left as viewed in Figures 4 and 5, it will be evident that the slide rods $f^2$ are also forced to the left with their pins $f^3$ thereby rocking the crank arms $h$ and pulling the pull rods $h'$ to the right. This linkage controls the power clutch, as will appear later.

In order to permit the cut print to be carried to the left by the conveyor slats $b$ after initiation of operation has been brought about by pressure of the butter on the bar $f$ it is evident that this bar $f$ must be swung upwardly to clear the print, as shown in Figure 5. This upward movement of the bar may be brought about by lifting arms $i$, the ends of which rest under the side rails $f'$ supporting the bar $f$ and the lower ends of which are supported on the same pivot $e^7$ with the rod $e^6$. Upward swinging movement of the lifting rods $i$ is effected by cams in a manner to be described.

The conveying slats $b$ are disposed loosely within a longitudinal opening in the table $a$ and are spaced by means of a fixed slat $a^2$ lying therebetween. The slats $b$ are interconnected to move as a unit by a cross bracket indicated in dotted lines at $b'$ in Figure 3. This bracket carries a downwardly depending frame $b^2$ of the peculiar configuration shown in Figure 5, which frame is engaged by a revolving crank arm in a manner to be described in order to effect longitudinal reciprocations of the conveying slats with the prints thereon. Engagement of the slats with the prints is better assured by cleats $b^3$ on their upper surfaces at the point where the print is deposited to be cut. During the reciprocations of these slats to the left, as viewed in Figure 5, they are raised momentarily about the level of the table and of the spacing slat $a^2$ by means of crank arms $b^4$ pivoted on the table and lying under the slats to lift them periodically, as will be described later.

There now remains to be described the power devices by means of which the various elements described are operated following initiation of the movement by engagement of the butter with the clutch bar $f$. The power shaft $g$ is geared to a lay shaft $g^2$ which has splined thereon a sliding clutch dog $g^3$ adapted to be engaged periodically with a co-operating clutch element $g^4$ which in turn is geared to a power shaft $g^5$ journaled transversely under the table $a$ and carrying the various power application means. The sliding dog $g^3$ is engaged operatively by a pivoted arm $g^6$ (Figure 5) which under the influence of a spring $g^7$ tends to throw the clutch elements $g^3$, into engagement with the clutch element $g^4$. When the butter is forced against the clutch bar $f$, however, so as to move it bodily to the left the rod $h'$ is pulled to the right as viewed in Figure 5 carrying with it a detent $h^2$ which normally checks movement of the clutch lever $g^6$ and restrains it against movement under the influence of the spring $g^7$. When the bar $h'$ is moved in the manner described the clutch element $g^3$ is thrown into engagement with the complementary section $g^4$, the two having interengaging teeth $g^8$ which finally mesh under the influence of the somewhat weak spring $g^7$. Coupling of the clutch elements at once causes rotation of the cross shaft $g^5$ through intermeshing gears $g^9$. On the cross shaft $g^5$ are mounted various driving means for the parts hereinbefore described. Figure 5 shows in side elevation a cam $k$ carried on this shaft and adapted to engage periodically a plate $h^3$ secured at the end of the clutch control bar $h'$, the action of the cam rotating in a counterclockwise direction, as indicated in Figure 6, to wipe the plate $h^3$ and pull the bar $h'$ to the left against the action of the spring $g^7$ thereby disengaging the clutch elements $g^3$, $g^4$. The means for holding the clutch elements disengaged against the action of the spring $g^7$ include a crank arm $l$ keyed on the shaft $g^5$ and carrying a pin $l'$ which seats at a predetermined time on a horizontal plane flange $h^4$ carried with the bar $h'$. Since the spring $g^7$ is rather light the engagement of the pin $l'$ on the flat flange $h^4$ serves effectively to restrain the bar $h'$ against movement until some moving force is applied thereto as when another print is pressed against the clutch bar $f$ in the manner before described.

On the shaft $g^5$ is keyed a cam $m$ which revolves in proper timing to engage operatively and slide towards the left a control bar $m'$ to which are pivoted the bell crank levers $b^4$ hereinbefore described. The cam $m$ by its operation forces the bar $m'$ towards the left swinging the upper ends of the crank arms $b^4$ upwardly to lift the conveying slats $b$. When the cam $m$ is moved out of operative engagement with the bar $m'$ the weight of the parts serves to swing the crank arms $b^4$ in a contrary direction and permit the slats $b^4$ to drop to their normal level.

On the revolving arm $l$ may be carried in addition to the pin $l'$, but at the opposite side of the arm, another pin $l^2$ which engages the whole bracket $b^2$ periodically, first at one side and then at the other to slide the slats $b$ first towards the left and then towards the right thereby conveying a print of butter for a distance towards the left and returning to receive the next print of butter. The timing is so regulated, of course, that the slats $b$ are in elevated position under the influence of the crank arms $b^4$ while the print is being conveyed towards the left and are permitted to drop below the level of the table and of the spacing bar $a^2$ while the slats themselves are being returned towards the right into position for receiving another print.

On the same cross shaft $g^5$ is secured another cam $n$ on the surface of which rests directly the operating bar $e^6$ for the cutter frame $e^3$. The cam $n$ in this relation, elevates the cutting frame by direct engagement with the bar. At the proper time, the frame $e^3$ is drawn downwardly to actually cut the butter by the engagement of a pin $n'$ on the face of the cam $n$ with a curved hook $e^8$ carried with the pull down bar $e^6$. As viewed in Figure 7 the cam $n$ rotates in a counterclockwise direction, of course. On the reverse face of the cam $n$ is a second pin $n^2$ which engages periodically a curved shoe $i'$ carried with the lifted bar $i$ by which the clutch bar $f$ is elevated periodically out of the path of the print. This bar $f$, with the lifter bar $i$, will drop by gravity when the pin $n^2$ rides off the shoe $i'$.

Figure 9 shows a kick-off arrangement whereby the cam $k$ in Figure 6 is prevented from remaining in contact with the plate $h^3$, a relation which obviously would prevent further movement of the clutch operating bar $h'$. The device in Figure 9 consists merely of a cam $o$ on the end of the shaft $g^5$ which is spring-pressed under the influence of a pivoted bar $o'$ and spring $o^2$, the pressure of the spring being effective at about the time the cam $k$ is at its high point with respect to the plate $h^3$. The action is to give the shaft $g^5$ a final quick kick sufficient to throw the cam $k$ downwardly off the plate $h^3$.

The operation of the machine has been indicated somewhat in connection with the detailed description of the various parts but the timing will be better understood by a brief résumé thereof. The butter emerging from the mouth of the chute $c'$ engages the clutch bar $f$ and by its pressure moves the clutch bar towards the left. This movement is translated to the control bar $h'$ which is retracted permitting the spring $g^7$ to throw in the clutch element $g^3$. Rotation of the shaft $g^5$ thereupon commences instantly. The pin $n'$ is carried immediately into engagement with the hook $e^8$ thereby drawing the cutter bar $e^3$ with its wire downwardly to cut a print. As soon as the print is cut the bars $i$ and $e^6$ are lifted to raise the clutch bar $f$ out of the path of the print and to raise the cutter frame $e^3$ into position for another operation. At about that time the cam $m$ raises the arms $b^4$ to lift the slats $b$ and the pin $l^2$ on the arm $l$ engages the bracket $b^2$ and draws the slats towards the left thereby conveying the print. After the slats have made their predetermined travel the cam $m$ releases the bar $m'$ so that the slats may drop freely and the pin $l^2$ engages the opposite side of the bracket $b^2$ to slide the slats in the opposite direction to receive another print. Meanwhile, the lifter bar $i$ drops with the clutch bar $f$. Then the parts are ready for a new sequence of operation. A dwell in operation is necessary, however, while an additional mass of butter is being ejected from the chute. This dwell is obtained by disconnecting the clutch elements $g^3$, $g^4$. This is done by the cam $k$ which engages the plate $h^3$ and draws the bar $h'$ against the clutch handle $g^6$ so as to throw the clutch. The parts are held in this relation by engagement of the pin $l'$ with the flange $h^4$. The cam $k$ is connected out of engagement with the plate $h^3$ by the spring-pressed cam $o$ shown in Figure 9. When the butter has emerged to a sufficient extent to again press against the clutch bar $f$ the same sequence of operations is repeated.

As pointed out before changes in details of design may be made without departing from the spirit of the invention and equivalent mechanical elements may be substituted for those described.

What I claim is:

1. In a machine for cutting material of the nature described, a hopper to receive the material in bulk and having a discharge chute in its side wall, and feeding mechanism for discharging the material from the hopper, comprising a revolving paddle and an oscillating arm operated by the paddle movable into the mouth of the chute.

2. In a machine for cutting material of the nature described, a hopper to receive the material in bulk, a discharge chute leading from the hopper, an arm adapted to move into the mouth of the chute and a revolving paddle to oscillate the arm into and away from the mouth of the chute.

3. In a machine of the character described, a hopper having a discharge chute, a bell crank lever pivoted within the hopper and having one arm movable into the mouth of the chute, a revolving paddle in the hopper to move said arm into the mouth of the chute and a second arm of the bell crank lever engageable by the paddle to move said first named arm away from the mouth of the chute.

4. In a machine of the character described, a hopper having a discharge chute, a bell crank lever pivoted within the hopper and having one arm movable into the mouth of the chute, a revolving paddle in the hopper to move said arm into the mouth of the chute and a second arm of the bell crank lever engageable by the paddle to move said first named arm away from the mouth of the chute, and a gate member pivotally carried by the first named arm at one side of the mouth of the chute to co-operate with said arm and with the wall of the chute to direct the material into the chute.

5. In a machine of the character described, a circular hopper to receive the bulk of material and having a discharge chute, a reversely curved paddle mounted in the hopper and engaging the walls snugly, power means to revolve the paddle, a curved arm pivoted at one side of the hopper and having its free end engageable by the curved side of the paddle while the arm is forced by the paddle into the mouth of the discharge chute.

6. In a machine of the character described, devices for discharging, cutting and conveying material in a straight line, including a discharge chute, a vertically reciprocating cutter mounted in proximity to the chute, conveyor means onto which the material is discharged for cutting and means engaged by the discharged material to initiate operation of the cutting and conveying devices.

7. In a machine of the character described, a discharge chute, longitudinally reciprocable conveyor slats on which the material is discharged, vertically reciprocable cutting means mounted in proximity to the discharge chute to cut the material in predetermined lengths, and means in the path of the material movable by the pressure thereof to initiate operation sequentially of the cutting devices and the conveyor slats.

8. In a machine of the character described, a discharge chute vertically reciprocable cutting means in proximity to the discharge chute, conveying means onto which the material is discharged, a bar in the line of discharge of the material movable by the pressure thereof, power means, means to move said bar out of the path of the material and a clutch for the power means controlled by movement of said bar to initiate operation sequentially of all of said devices.

9. In a machine for cutting material of the character described, a power shaft, a driven shaft, a clutch to connect said shafts, a bar disposed in the path of the material and adapted to be moved by the pressure thereof and linkage operatively interconnecting said bar and said clutch to control the movements thereof, cutting devices for the material, conveyor devices for the material cut, and means carried by the second named shaft to operate said cutting and conveying means when the clutch is thrown.

This specification signed this 1st day of November A. D. 1924.

RICHARD F. STEWART.